United States Patent Office 2,833,737
Patented May 6, 1958

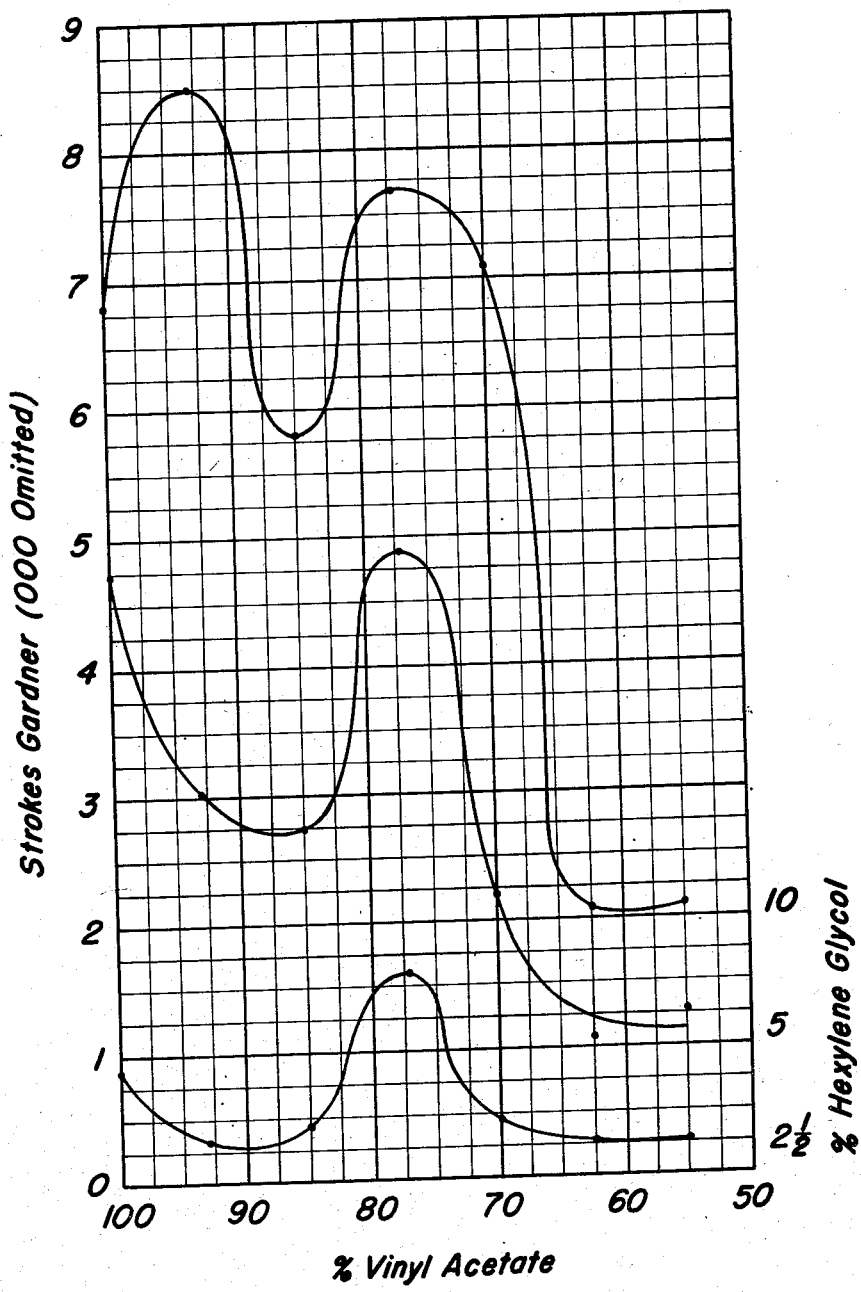

2,833,737

VINYL ACETATE EMULSION

Jacob G. Mark and David Rubinstein, Brookline, Norman G. Tompkins, Melrose, and Anthony J. Urjil, Byfield, Mass., assignors to W. R. Grace & Co., Cambridge, Mass., a corporation of Connecticut Application December 30, 1954, Serial No. 478,626

6 Claims. (Cl. 260—29.6)

Polyvinyl acetate is one of the more useful of the thermoplastic resins. Especially in emulsion form, it is an excellent film forming, adhesive and bonding agent. Because of this, polyvinyl acetate emulsions have come into widespread use as vehicles for water based paints.

As vehicles for water based paints, polyvinyl acetate emulsions have been found to have many advantages, including light color and good color stability, good stability to oxygen and ultraviolet light resulting in good resistance to exterior exposure, self priming properties on porous surfaces, reasonable cost, excellent grease and oil resistance of the films, good adhesion to most substrates, good moisture vapor permeability tending to eliminate blistering and peeling and good emulsion stability unaffected by acidic materials or polyvalent ions.

However, in order to be useful as paint vehicles, polyvinyl acetate emulsions must first be mixed with a plasticizer. The plasticizer confers the necessary flexibility and extensibility to what would otherwise be a hard and brittle film. In addition, the plasticizer aids in the process of film formation probably because of its softening effect on the resin particles. Usually from 5 to 15% or more of a phthalic ester such as dibutyl phthalate is necessary, based on the resin content of the emulsion.

The fact that a plasticizer must be used as a part of the vehicle in a paint based upon a polyvinyl acetate emulsion is both an advantage and a serious disadvantage. On the one hand, a paint formulator, by using different plasticizers, in varying amounts, can, to some extent tailor his vehicle to suit his particular requirements. However, the film forming material in such a case is a physical mixture of two materials, the polyvinyl acetate resin and the plasticizer. Like all such mixtures, this mixture may be separated by such physical processes as evaporation, migration or leaching. This is an important potential source of trouble where the durability and weather resistance of thin films is involved. The separation and loss of plasticizer over a period of time and of exposure can seriously embrittle the film. In addition, the use of an organic liquid plasticizer as part of the vehicle in an emulsion paint has, at times, caused color difficulties where organic pigments have been used due to the possibility of flushing between the water and plasticizer phases.

Polyvinyl acetate has a further failing in common with many other water insoluble polymers, in that films and coatings formed from emulsions of polyvinyl acetate under normal drying conditions are quite water susceptible. The apparent reason for this water susceptibility is that the water susceptible materials required to form a stable emulsion of the polymer persist in the dried film or coating, and tend to make that dried film or coating re-emulsifiable.

It has previously been proposed that the loss of plasticizer could be prevented were the vinyl acetate to be copolymerized with certain polymerizable plasticizers. The most useful of such plasticizers are certain aliphatic esters of maleic or fumaric acid. It has likewise previously been proposed that the water susceptibility of films and coatings formed from polyvinyl acetate emulsions could be reduced by the addition to the emulsion of certain glycols such as hexylene glycol and other analogous substances.

We have found a unique increase in the wet abrasion resistance of films and coatings if the maleic content of the copolymer lies in a certain critical range. We produce permanently flexible films and coatings having outstanding stability under conditions of wet abrasion in the presence of soapy water emulsions when the proportion of dibutyl maleate in the monomer mixture lies in the critical range of between 17½ and 32½% and when between 5 and 17% by weight of the polymer solids of hexylene glycol has been added to the polymer emulsion. The maximum effect occurs when the ratio of vinyl acetate monomer to dibutyl maleate is 77 to 23. Ranges on either side of this maximum but within the critical range are useful products and show scrub resistance which is far above the values usually found in polyvinyl acetate base paints. This is surprising since one would normally anticipate that as the maleate content of such a copolymer increased, the films or coatings formed from an emulsion of the copolymer would become more flexible and hence softer. It would further be expected that as the films became softer, the resistance to wet abrasion would be reduced. As the data in the following table and in the corresponding plot, Figure I, clearly shows there is such a tendency except in the range where the copolymer contains between 17½ and 32½% of dibutyl maleate and correspondingly 82½ to 67½% vinyl acetate in which range the wet abrasion resistance of the copolymer is greatly increased.

TABLE I

*Wet abrasion resistance as strokes Gardner*

| Sample | Percent Vinyl Acetate | Percent Hexylene Glycol | | | |
|---|---|---|---|---|---|
| | | 0 | 2.5 | 5.0 | 10.0 |
| A | 100 | 50 | 870 | 4,740 | 6,790 |
| B | 93 | 50 | 320 | 3,020 | 8,490 |
| C | 85 | 50 | 430 | 2,710 | 5,790 |
| D | 77 | 50 | 1,610 | 4,890 | 7,650 |
| E | 70 | 50 | 450 | 2,220 | 7,090 |
| F | 62.5 | 50 | 270 | 1,060 | 2,076 |
| G | 55 | 50 | 260 | 1,280 | 2,090 |

The data for this table was obtained in the following manner. Films of the unpigmented emulsion, at approximately 50% solids in each case, were laid down on a clean ground plate glass plate using a Baker gauge set at a clearance of about 0.002″. The film was then dried at room temperature for a time period of between 16 and 20 hours. This resulted in a dry film having a thickness of approximately 1 mil. This thin film was chosen in order to accelerate the test. At the end of the drying period each of the films so prepared was scrubbed on a Gardner straight line washability machine using the standard Chinese hog bristle brush weighing one pound. Before the start of the test the brush was thoroughly soaked in water containing 0.5% of powdered soap in solution (specifically, Ivory Snow) and additional quantities of this solution were applied to the testing panel during the test at a rate sufficient to keep the sample moist at all times. In each case the test was continued until the film failed. The results are presented in terms of strokes of the Gardner machine and represent the average of several runs in each case.

In Table I, in those instances where failure is indicated at fifty strokes, failure actually occurred at somewhat less than fifty strokes and was due to the re-emulsification of the film. In all other instances, the failure was due to the erosion of the film and the test was concluded when any portion of the film had completely worn away.

The samples above were prepared in the following manner:

In each case the following solution was first prepared—

|  | Grams |
|---|---|
| Ammonium persulfate | 0.3 |
| Sodium bicarbonate | 0.18 |
| Dioctyl ester of sodium sulfosuccinic acid (Aerosol OT) | 0.1 |
| Polyvinyl alcohol | 4.0 |
| Water | 78.0 |

100 grams of monomer or monomer mixture as follows was then added to this solution slowly while the solution was vigorously agitated:

Sample A_____ 100 vinyl acetate.
Sample B_____ 93 vinyl acetate, 7 dibutyl maleate.
Sample C_____ 85 vinyl acetate, 15 dibutyl maleate.
Sample D_____ 77 vinyl acetate, 23 dibutyl maleate.
Sample E_____ 70 vinyl acetate, 30 dibutyl maleate.
Sample F_____ 62.5 vinyl acetate, 37.5 dibutyl maleate.
Sample G_____ 55 vinyl acetate, 45 dibutyl maleate.

The aqueous emulsion resulting therefrom was then transferred to a reaction flask equipped with a sealed stirrer, a thermometer and a reflux condenser. The reaction mixture in the flask was then heated while being agitated to a temperature of 67–68° C. and maintained at that temperature until the polymerization reaction was initiated. As the polymerization reaction continued, the temperature was permitted to rise to about 75–80° C. at a very slow rate and the reaction thereafter was maintained at that temperature. The reaction was continued until virtual completion and was discontinued only after the residual monomer content as determined by titration was less than 1%. The emulsion was then cooled to room temperature and sufficient sodium bicarbonate was added to adjust the pH to a range of 4.5 to 7.0.

A sufficient quantity of a solution of equal parts by weight of hexylene glycol and water was added to portions of each of the samples with stirring to make the concentration of hexylene glycol expressed as percent by weight of the total emulsion solids 2.5, 5.0 and 10.0 respectively. It has been found also that the hexylene glycol solution can be added to the polymerization mixture as a portion of the water needed to make the emulsion without any adverse effects and with the advantage that the resulting final emulsion has a higher total solids content.

Potassium persulfate, sodium persulfate and hydrogen peroxide can be used instead of ammonium persulfate as the reaction catalyst with equally effective results. The concentration of available oxygen based on the weight of the monomer is preferably between 0.01 and 1.0%.

Instead of the dioctyl ester of sodium sulfosuccinic acid, many of the sodium salts of alkyl sulfonates, the esters of the sodium salts of the alkyl sulfonates, the sulfates of higher alcohols, the ethylene oxide condensation products of alkyl phenols or the polyethylene glycols of fatty acids may be used as a wetting agent.

The polyvinyl alcohol used as an emulsifier is a hydrolyzed polyvinyl acetate prepared by hydrolyzing a polyvinyl acetate having a viscosity of between 7 and 100 centipoises as a molar solution in benzene to a residual acetate content of 1 to 25%. The preferred concentration range of such an emulsifier is between 3 and 7% based on the weight of the monomer.

Unlike the maleate content, the amount of hexylene glycol is not particularly critical. At below about 5% hexylene glycol on the weight of the copolymer the effect becomes too small to be of any particular significance. As the quantity of hexylene glycol is increased, the drying time of films and coatings formed from the copolymer emulsion is progressively retarded. Above about 17% hexylene glycol content the drying time becomes excessively long and the film or coating remains tacky for extended periods.

Besides hexylene glycol, the following glycols, substituted glycols or glycol derivatives have been found to be useful in enhancing the water resistance of the film: 3-chloro-1,2-propane diol; butyl carbitol (2-(beta butoxy ethoxy)ethanol); butyl Cellosolve acetate (2-butoxy ethanol acetate); Carbitol (2-(beta ethoxy ethoxy) ethanol); and dipropylene glycol. Under the conditions of Table I, using the copolymer emulsion comprising the 77% vinyl acetate and 23% dibutyl maleate with the addition of 5% of the consolidating additive the following results were obtained:

TABLE II

| Additive | Strokes |
|---|---|
| 3 chloro, 1,2 propane diol | 2,900 |
| Butyl Carbitol | 5,160 |
| Butyl Cellosolve acetate | 2,510 |
| Carbitol | 3,450 |
| Dipropylene glycol | 5,710 |

Besides dibutyl maleate (di-1-butyl butenedioate), the following maleate esters have been found to be satisfactory: diethyl maleate (diethyl butenedioate); diisopropyl maleate (diisopropyl butenedioate); di(methyl amyl) maleate (di-1,4-dimethyl-1-butyl butenedioate); and di-2-ethyl hexyl maleate (di-2-ethyl hexyl butenedioate). In a scrub resistance test run under the same conditions as Table I using an emulsion of the copolymer of 77% vinyl acetate and 23% of the specified maleate ester with the addition of 10% hexylene glycol the following results were obtained:

TABLE III

| Ester | Strokes |
|---|---|
| Diethyl maleate | 9,720 |
| Diisopropyl maleate | 7,270 |
| Di(methyl amyl) maleate | 15,090 |
| Di 2 ethyl hexyl maleate | 5,610 |

Throughout the specification the term maleate is used as a convenient expression instead of the more proper term "Butenedioate." It is intended to include both the cis form (maleate) and the trans form (fumarate). On comparative tests run using a pure maleate ester, the corresponding pure fumarate ester, and the corresponding ester comprising a mixture of maleate and fumarate, no significant difference was noted.

These emulsions are particularly useful in the preparation of water based paints. They have been used as a vehicle for such paints for both interior and exterior use with great success. Such paints are characterized by permanent flexibility since the vehicle neither loses its plasticizer content nor is it subject to oxidation. As an illustration of such permanent flexibility, three paints were prepared, identical in formulation except that two were based on an externally plasticized polyvinyl acetate emulsion and the third was based on the preferred copolymer emulsion as given above. These paints were drawn down to equivalent film thickness on tin plate panels which were then aged at 60° C. for 8 days in an oven with circulating air. The panels were then cooled to room temperature and bent 90 degrees over a ½ inch mandrel. The films of both paints based on externally plasticized polyvinyl acetate ruptured in this test whereas the paint film based on the copolymer emulsion remained unaffected.

Another particular advantage of such paints is that they have a vastly improved ability to consolidate at low temperatures. Even at temperatures where paint films based on externally plasticized polyvinyl acetate emulsions fail to consolidate, paint films based upon the copolymer emulsion show good consolidation.

This can be shown by measuring the specular reflectance of paint films. Samples were prepared applying films of water based paints to gypsum-board panels at a reduced temperature and drying these films at the reduced temperature in a storage chest having circulating air and a relative humidity of 50% or less. Prior to the test the paints, the test panels, and the brushes used in applying the paint were stored in the chamber for a time sufficient to insure that the temperature of each had come to equilibrium. After the films had dried, the samples were allowed to attain room temperature and one coat of a semigloss oil based wall paint was applied over the test film. After this coat had dried, the specular reflectance of each sample was measured on a Hunter reflectometer according to the procedure set forth in the Journal of Research of the National Bureau of Standards, volume 25, pages 582–618, November 1940. The reflectance is a measure of the consolidation of the priming coat of water based paint. For example, the reflectance of a film of semigloss paint when applied to an unprimed board is less than 0.7, the minimum reading of the reflectometer.

With samples prepared at a temperature of 70° F., reflectance in each instance was about the same with a reading of between 5.2 and 5.6. The greatest variation in reflectance occurred in samples prepared at a temperature of 50° F. At this temperature a paint using a straight polyvinyl acetate emulsion as a vehicle gave a reading of 0.7; whereas, paints using a 77–23 copolymer of vinyl acetate and dibutyl maleate gave readings of 2.4 with 5% hexylene glycol, 3.7 with 10% hexylene glycol, and 4.8 with 17% hexylene glycol.

In addition, paints based upon the copolymer have a sufficient degree of moisture permeability to allow the passage of moisture which would otherwise remain trapped and cause unsightly blisters or peeling. To show this, two identical panels of wood were taken. One of these was painted with an oil based primer followed by two coats of the conventional oil based paint, according to the recommendations of the manufacturer. The other panel was painted with two coats of a paint based on the preferred copolymer emulsion. The two panels were then sealed with caulking compound to the open sides of a five gallon square can and the unpainted backs were exposed to a temperature of 50 to 60° C. and a relative humidity of 100% for a period of 48 hours. The wood panel painted with the oil paint showed extensive blistering where the trapped moisture was unable to escape. The panel painted with the paint based on the copolymer emulsion remained completely unaffected.

The particular paint used in both of the above tests was made according to the following formulation:

|   | Lbs. |
|---|---|
| Rutile titanium dioxide | 275 |
| Diatomaceous earth | 70 |
| Phenyl mercuric borate | 0.1 |
| Polyvinyl acetate 10% solution in water | 40 |
| Water dispersible soya lecithin | 10 |
| Surface active agent | 4 |
| Water | 25 |

(These ingredients are combined and form a paste which can conveniently be stirred on a paste mixture. Mix thoroughly.)

| Water | 75 |
|---|---|

(After this is thoroughly stirred in, the paste is given one pass through a high-speed stone mill. If a roller mill is used, some or all of the last addition of water should be held out and added after the milling operation.)

| Preferred copolymer emulsion | 432 |
|---|---|
| Methyl cellulose (4000 vis.) 4% solution in water | 75 |
| Water | 25 |

(With the paste in a thinning tank, these ingredients are then added and stirred in well.)

| Water and/or methyl cellulose solution for adjustment of viscosity | 59 |
|---|---|
| Total | 1090.1 |

An alternate formulation for preparing a white paint is as follows:

|   | Lbs. |
|---|---|
| Rutile titanium dioxide | 280 |
| Dry ground mica | 20 |
| Methyl cellulose (4000 vis.) 4% solution in water | 60 |
| Water | 175 |

(Stir in paste mixer, then grind in high-speed stone mill. Roller may be used if some water is held out.)

| Rosin-ethylene oxide adduct | 2 |
|---|---|
| Water | 50 |

(Stir but avoid foam.)

| Bacteriostatic agent | 8 |
|---|---|
| Preferred copolymer emulsion | 420 |
| Water and/or methyl cellulose solution to adjust viscosity | 20 |

(Stir and adjust viscosity. Stir thoroughly.)

| Total | 1035 |
|---|---|

These copolymer emulsions appear to be compatible with all of the compounding ingredients normally used in water based paints and appear to require no special precautions other than those ordinarily taken in the manufacture of paints using externally plasticized polyvinyl acetate as the vehicle. Calcium based titanium pigments should be avoided, since, although they do not de-stabilize the emulsion, they do render the film more water sensitive. Also, because the paint made from such an emulsion is normally slightly acid, the lithopones should be used with caution and only after thorough testing.

The preferred emulsion is also of great advantage in Lumnite and Portland cement paste or paints. Used as an admixture in place of part of the water normally used, the copolymer emulsion greatly increases the adhesive properties of such pastes or paints and permits a substantial reduction in total water requirement while at the same time improving plasticity. Unlike pastes and paints containing ordinary polyvinyl acetate emulsion, pastes and paints containing the copolymer emulsion are water resistant and will withstand continuous water immersion without softening or disintegration.

As a binding paste, the following composition has been found to be very satisfactory:

| | Parts by weight |
|---|---|
| Cement | 100 |
| Copolymer emulsion (solids) | 20 |
| Water | 20–20 |

In applying a new layer of mortar or concrete to old mortar or concrete the surface should be cleaned of oil, grease, loose material and all foreign matter. The clean surface is then dampened with water and the bonding paste, mixed to consistency such as that of a fairly thick brushable paint, is spread over the surface. This is preferably done with a stiff bristle brush or a stiff broom in order to work the paste into the irregularities of the surface. The new mortar or concrete is preferably applied immediately, in normal manner. It has been found that the bond strength resulting when the new mortar or concrete is added without permitting the bond-in coat to dry is about twice that obtained when the bonding coat has been permitted to dry. In either case, the strength of the bond caused by the bonding paste is usually greater than that of either the new or old mortar or concrete. Advantageous results are also obtained should a final trowelling or finishing operation be needed, by using a very dilute skim coat of bonding paste as the topping.

The copolymer emulsion also imparts some unusual qualities to cement paints. A typical satisfactory cement paint has the following formulation:

| | Parts by weight |
|---|---|
| Copolymer emulsion (solids) | 5 |
| Cement | 10 |
| Water sufficient to give a paintable consistency. | |

The properties of such a paint are surprising. Its adhesion to iron and steel is such that sheet metal having two coats of this paint can be bent through 90° without cracking or flaking off. The paint is also exceptionally rust resistant, and can be used to apply coatings to metal, even corroded metal, which coatings are durable and prevent initial or further corrosion of the metal. Steel plates painted with this cement paint showed no rusting event after 1224 hours of exposure in an Atlas weatherometer, whereas steel plates coated with a high-grade oil base rust preventative paint showed rust spots under the same conditions at the end of 360 hours. These cement paints are also particularly effective where acidic or other types of corrosive waters are involved and may be used to protect structural steel subject to weathering and corrosive industrial fumes, for much longer periods of time than is possible with conventional rust preventative paints.

Where ordinary weathering is involved regular Portland cement (ASTM type 1) may be used. Where the coated metal will be exposed to sea water, acidic waters, salt spray, acidic industrial fumes, etc. "Lumnite," a high alumina cement should be used. Where moderate exposure to acidic or sulfate waters is involved low $C_3A$ Portland cement (ATSM type 2) may be used. For severe exposures when "Lumnite" or similar high alumina are not available, Portland cements of very low $C_3A$ content (like modified oil well or ASTM type 3) may be used. Of course, if color is important, white Portland cement can be used for light colors or colored cements or suitable pigments for particular colors.

The cement paint may be applied by either brush or spray. Since the paint does set up, it is important that only enough paint be mixed at any one time to last thirty minutes to an hour.

The cement paint can be applied to all types of material. In the case of metal surfaces it is necessary only to remove the loose scale and rust, and if present, any oil or grease films or oil based paint coatings. In the case of masonry surfaces or other surfaces which will absorb moisture the surface should be wetted down with water before applying the paint, to insure adequate hydration of the cement content of the paint. It is not necessary, however, to cure the cement paint by means of a water spray or with wet burlap or the like.

We claim:

1. A composition of matter comprising in combination, an aqueous dispersion of the copolymer formed by the emulsion polymerization of vinyl acetate and the di-ester of a butenedioic acid and an aliphatic alcohol selected from the group consisting of ethanol, 1-butanol, propanol, 1,4-dimethyl-1-butanol and 2-ethyl-1-hexanol, the said monomeric ingredients being present in the proportion of 82½ to 67½ parts by weight of vinyl acetate and 17½ to 32½ parts by weight of the di-ester and from 5 to 17 parts by weight, per 100 parts by weight of the copolymer solids, of a compound selected from the group consisting of hexylene glycol, 3-chloro-1,2-propanediol, 2-(beta butoxy ethoxy)ethanol, 2-butoxy ethanol acetate and di-propylene glycol.

2. A water based paint containing the composition of claim 1 as the vehicle thereof.

3. A composition comprising hydraulic cement and the composition of claim 1.

4. The composition of claim 1 in which the di-ester is a di-1-butyl butenedioate.

5. The composition of claim 4 in which the glycol is hexylene glycol.

6. A composition of matter comprising in combination, an aqueous dispersion of the copolymer formed by the emulsion polymerization of about 77 parts by weight of vinyl acetate and about 23 parts by weight of a di-1-butyl butenedioate and from 5 to 17 parts by weight, per 100 parts by weight of the copolymer solids, of hexylene glycol.

References Cited in the file of this patent

UNITED STATES PATENTS

| 2,410,089 | Lundquist et al. | Oct. 29, 1946 |
| 2,570,253 | Lundquist | Oct. 9, 1951 |
| 2,588,543 | Kunze et al. | Mar. 11, 1952 |
| 2,662,064 | Mead | Dec. 8, 1953 |